United States Patent [19]

Hire et al.

[11] Patent Number: 4,629,768
[45] Date of Patent: Dec. 16, 1986

[54] THERMALLY STABLE POLYURETHANE ELASTOMERS CONTAINING GLYCOSIDE POLYOLS AND A METHOD OF PRODUCING THEM

[75] Inventors: Robert C. Hire, Dayville; John E. Puig, Wallingford, both of Conn.

[73] Assignee: Olin Corporation, Chesire, Conn.

[21] Appl. No.: 858,982

[22] Filed: May 2, 1986

[51] Int. Cl.$^4$ .............................................. C08G 18/32
[52] U.S. Cl. ...................................... 525/458; 528/73
[58] Field of Search ........................... 525/458; 528/73

[56] References Cited

U.S. PATENT DOCUMENTS 3,073,788  1/1963  Hostettler et al. ................... 260/2.5
3,983,094  9/1976  O'Shea .............................. 260/77.5

OTHER PUBLICATIONS

Cimerol, J. J., and S. Fuzesi, *Polyurethanes for Tomor-* row, "Methyl Glucoside Based Rigid Urethane Polyols and Foam," Proceedings of the 26th Annual Technical Conference, 1981, pp. 67–70.

*Primary Examiner*—Maurice J. Welsh
*Attorney, Agent, or Firm*—Dale L. Carlson; Thomas P. O'Day

[57] ABSTRACT

The use of glycoside polyols together with diol or triol-initiated polyols in the production of polyurethane elastomers provides elastomers which are thermally stable at temperatures of 140° F. or higher. These polyurethane elastomers are useful as thermoconductivity barriers in window holders exposed to high-temperature conditions, as engine mounts on automobiles, as encapsulators for electronic distributors, and the like.

13 Claims, No Drawings

THERMALLY STABLE POLYURETHANE ELASTOMERS CONTAINING GLYCOSIDE POLYOLS AND A METHOD OF PRODUCING THEM

FIELD OF THE INVENTION

This invention relates generally to polyurethane elastomers; and, more specifically, to thermally stable elastomers produced using glycoside polyols.

BACKGROUND OF THE INVENTION

Cellular polyurethane foams made by reacting an organic polyisocyanate with a polyether containing methyl glucoside in the presence of a blowing agent are known in the art. For example, Hostettler et al, U.S. Pat. No. 3,073,788, assigned to Union Carbide Corporation, discloses such cellular foams and their methods of preparation. The '788 patent teaches that the foams disclosed herein are capable of preparation without the application of external heat and have either high or low density by suitable modification, good resistance to solvents, and little tendency to support combustion.

Methyl glucoside is known in the art to provide polyurethane foams characterized by their ability to continue to swell and not shrink, even under severe heat aging conditions of 230° F. Such a disclosure is found in a technical article by J. J. Cimerol and S. Fuzesi, "Methyl Glucoside Based Rigid Urethane Polyols and Foam," printed in Polyurethanes for Tomorrow, proceedings of the SPI 26th Annual Conference (1981).

Thermoplastic polyurethane elastomers based on poly(oxypropylene)-poly(oxyethylene)glycol wherein the oxyethylene content is at least 15 percent are disclosed in U.S. Pat. No. 3,983,094, assigned to Uniroyal, Inc., as being thermally stable for processing steps such as painting at temperatures as high as 250° F. However, these elastomers are thermoplastic and would melt if exposed to such a high temperature for more than a very brief period of time. Moreover, these elastomers are frequently produced using an ethylene glycol or 1,4-butanediol chain extender and, since the ethylene glycol or 1,4-butanediol is generally not soluble in the reaction medium, separation of the reaction mixture occurs on standing.

Non-foam thermosetting polyurethanes such as elastomers capable of withstanding high temperatures of at least about 140° F. or higher for at least twelve hours were not known prior to the invention herein, based upon the knowledge of the present inventors. Indeed, prior art polyurethane elastomers tend to exhibit thermal degradation at temperatures well under 140° F in such a time interval.

The disadvantages associated with using polyurethane elastomers that tend to thermally degrade at temperatures of 140° F. or lower are readily apparent. For example, when using such elastomers as a thermoconductivity barrier for aluminum window frames, such degradation conditions can cause the windows to fall out of their frames. On this basis, the discovery of new polyurethane elastomers resistant to high temperature thermal degradation would be highly desirable.

SUMMARY OF THE INVENTION

In one aspect, the present invention relates to a polyurethane elastomer comprising the reaction product of at least one polyisocyanate with at least two polyether polyols, wherein one of said polyether polyols contains at least one glycoside moiety, said elastomer being essentially free of cellular structure.

In another aspect, the present invention relates to a method of using a glycoside polyol which comprises reacting the glycoside polyol with a polyisocyanate to produce a polyurethane essentially free of cellular structure and characterized by thermal stability at a temperature of at least about 140° F. for a time period of at least 12 hours.

Still another aspect of the present invention relates to a method of producing a thermally stable, thermosetting polyurethane elastomer essentially free of cellular structure containing both glycoside-free and glycoside-containing polyurethane which comprises a "one-shot" reaction which includes:

(a) reacting a glycoside polyol with an isocyanate to produce a glycoside-containing polyurethane, (b) reacting a diol, triol or amine-containing polyol with an isocyanate to produce a glycoside-free polyurethane, said glycoside-containing polyurethane being present in an amount of between about 40 and about 90 weight percent based upon the total weight of said glycoside-containing polyurethane and said glycoside-free polyurethane wherein steps (a) and (b) are carried out simultaneously at atmospheric pressure and a temperature between about 25° C. and about 150° C.

DETAILED DESCRIPTION OF THE INVENTION

The production of polyurethane elastomers by reacting an organic polyisocyanate with a polyol is well known. In the production of polyurethane elastomers in accordance with the present invention, a glycoside-based polyether polyol produced by propoxylation of at least one glycoside is used in conjunction with another polyether polyol produced by propoxylating a diol, triol or amine such as glycerol, diethylene glycol, monoethylene glycol propylene glycol, or the like. The glycoside-initiated polyether polyol tends to contribute to the production of a thermally-stable hard and stiff elastomer having fairly low elasticity upon reaction with isocyanate, whereas the diol-initiated polyether polyol contributes flexibility and elasticity to the elastomer. When blended together, the glycoside-initiated polyether polyol and the diol-initiated polyether polyol provide an elastomer upon reaction with isocyanate that is characterized by a combination of hardness, thermal stability, flexibility, and elasticity. The glycoside-initiated polyol preferably comprises between about 40 weight percent and about 90 weight percent, more preferably between about 70 and about 90 weight percent, of the total weight of polyol used. When all of the polyol employed is glycoside-containing, the resulting urethane is both hard and thermally-stable, but is not an elastomer having significant elasticity and flexibility.

The term "glycoside" as used herein refers to a non-reducing monosaccharide in which an alkyl or aralkyl radical is attached to a carbonyl carbon atom through an oxygen atom.

Among the glycosides which can be employed are the alpha and beta forms of methyl-D-arabinoside, methyl-D-xyloside, ethyl-D-xyloside, n-butyl-D-riboside, methyl, ethyl, propyl, butyl and 2-ethylhexyl-D-glycoside, 2-ethylhexyl-D-fructoside, isobutyl-D-mannoside, ethyl-D-galactoside, benzyl-D-glucoside and methyl-L-rhammoside. The preferred glycosides are the alkyl glycosides, and preferably the lower alkyl glycosides in which the alkyl group contains one to six carbon atoms, most preferably methyl glucoside.

The above-described glycosides which are used in the practice of the invention constitute a known class of materials. In general, the synthesis of glycosides may be accomplished by the Fischer method which involves reaction between simple sugars and the appropriate alcohol in the presence of an acid catalyst, or by methods based on the replacement of the halogen atom of tetraacetylglycosyl halides followed by saponification of the acetal groups. See Fieser and Fieser, Organic Chemistry, D. C. Heath & Co., Boston (1956), p.378.

The glycosides which are employed may be a single compound of definite composition or a mixture of isomers together with a small amount of residue products as obtained in the preparation of such compounds.

Suitable organic polyisocyanates may be any aromatic, cycloaliphatic and aliphatic diisocyanates and higher polyisocyanates. Suitable aliphatic diisocyanates include hexamethylene diisocyanate; 4,4'-dicyclohexylmethane diisocyanate; 1,4-tetramethylene diisocyanate; and 1,10-decamethylene diisocyanate. Suitable aromatic diisocyanates include toluene-2,4- or 2,6-diisocyanate (the mixture or each is also known as TDI); 1,5-naphthalene diisocyanate; 4-methoxy-1,3-phenylene diisocyanate; 4-chloro-1,3-phenylene diisocyanate; 2,4'-diisocyanatodiphenyl ether; 5,6-dimethyl-1,3-phenylene diisocyanate; 2,4-dimethyl-1,3-phenylene diisocyanate; 4,4'-diisocyanatodiphenylether; benzidine diisocyanate; 4,4'-diisocyanatodibenzyl; methylenebis(4-phenyl-isocyanate) (also known as MDI); 1,3-phenylene diisocyanate; and polyarylpolyphenylisocyanate (also known and referred to herein as PAPI). The preferred isocyanates are PAPI and MDI.

Glycoside polyols useful in the present invention have a molecular weight of between about 300 and about 3000, preferably between about 500 and about 2500, a hydroxyl number of between about 40 and about 500, preferably between about 45 and about 450, and a viscosity of between about 2,500 and about 20,000 cps., preferably between about 5,000 and about 10,000 cps. These can be prepared, according to well-known methods, by condensing propylene oxide with glycoside as a polyhydric initiator.

The diol, triol and amine-initiated polyols useful as a supplemental polyol in the present invention have a molecular weight of between about 500 and about 3000, preferably between about 1000 and about 2000; a hydroxyl number of between about 50 and about 200, preferably between about 100 and about 150; and a viscosity of between about 100 and about 1000 cps.; preferably between about 300 and about 600 cps. Typical polyhydric co-initiators used in preparing the polyether polyol reactant include the following and mixtures thereof: (a) the aliphatic diols such as ethylene glycol, 1,3-propylene glycol, 1,2-propylene glycol, butylene glycols, butane diols, pentane diols, and the like; (b) the aliphatic triols such as glycerol, trimethylolpropane, triethylolpropane, trimethylolhexane, and the like; (c) the polyamines such as tetraethylene diamine; and (d) the alkanolamines such as diethanolamine, triethanolamine, and the like.

A preferred group of polyhydric co-initiators for use in preparing the polyether polyol reactant is one which comprises aliphatic diols and triols such as ethylene glycol, propylene glycol, glycerol, trimethylolpropane, and the like.

The propylene oxide-polyhydric initiator and coinitiator condensation reactions are preferably carried out in the presence of a catalyst such as KOH as is well known in the art. In effecting the reaction, a sufficient proportion of alkylene oxide is preferably used as to provide a final polyol product having an average molecular weight of about 200 to about 10,000, and more preferably about 300 to about 6,500. The catalyst is thereafter preferably removed, leaving polyether polyols which are ready for use in preparing the elastomers by a "one-shot" reaction of polyols with isocyanate.

It should be noted that the monoether and polyether polyol reactants useful in the present invention may be reacted with diacids or anhydrides to form polyester polyether polyols. Thus, polyester polyether polyols would be formed having carboxylic acid groups individually spaced on the molecule.

When producing these polyester polyether polyols, a peroxy-type free radical initiator may be employed. Typical peroxy-type free radical initiators include hydrogen peroxide and organo peroxides and hydroperoxides such as dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alphacumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxy-benzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, alpha-methylbenzyl hydroperoxide, alpha-methyl-alpha-ethyl benzyl hydroperoxide, Tetralin hydroperoxide, triphenylmethyl hydroperoxide, diphenylmethyl hydroperoxide, 2,5-di-methyl-2,5-bis(2-ethyl hexanoyl peroxy)hexane, 1,1-bis(t-butyl-peroxy) cyclohexane and t-butyl perbenzoate.

The reaction of polyether polyol with isocyanate to produce elastomers in accordance with the present invention does not require catalysis and, indeed, is a rapid reaction even in the absence of a catalyst. However, the rate of reaction between the polyether polyol(s) and the polyisocyanate(s) frequently may be increased by using of conventionally known polyurethane-forming catalysts. These include the tertiary amine catalysts and organometallic compounds such as organomercury and organotin compounds. However, the use of such catalysts is not required for purposes of the present invention.

The ratio of total isocyanate (NCO) groups to total hydroxy (OH) groups in the reactants is preferably in the range from about 1:1 to about 1.5:1; preferably, in the range from about 1:1 to 1.2:1.

It is preferred to carry out the polyether polyol-/isocyanate reactions in a "one-shot" procedure at a temperature of between about 25° C. and about 150° C. More preferably, the reaction temperature is in the range from about 25° C. to about 130° C. The reaction is suitably effected in an open mold at atmospheric pressure, although superatmospheric pressure can be used if desired. The curing time can range between several hours and about 24 hours, although a curing time of about 12 is preferred.

Generally, this reaction may be carried out without a solvent. However, in some cases, it may be desirable to employ a solvent. For example, if a very viscous polyether polyol is employed, it may be desirable to thin the reaction mixture with water or another solvent to facilitate the reaction.

The elastomers are suitably produced in accordance with the present invention in the absence of a chain-extender. However, in certain applications, a chain extender might be suitable. These include any compound having two active hydrogen-containing groups and a molecular weight between 18 and 200. Specific examples include diols, diamines, hydrazines, dihydrazides and the like. For this purpose, suitable compounds include ethylene glycol, ethylene diamine, isophorone diamine, diethylene glycol, and 1,4-butanediol.

The elastomers useful in the present invention can suitably contain optional ingredients, such as surfactants, plasticizers, pigments and fillers such as carbon black, silica and clay. Such optional ingredients may be incorporated into the elastomer in a minor amount of less than 50 weight percent based upon the total weight of the elastomer.

Super- or sub-atmospheric reaction pressure is not necessary for the polyol/isocyanate reactions. Atmospheric pressure is preferred in order to avoid the expense of special reaction vessels.

The elastomers produced in accordance with the present invention are thermosetting materials. As such, these elastomers are typically injection molded or "poured-in-place" using conventional molding techniques. Particularly preferred elastomers are those rigid elastomers having a Shore D hardness of between about 65 and about 85.

The elastomers produced in accordance with the present invention can be suitably used in the production of thermally stable coatings for metals and other materials, as well as thermal conductivity insulators for metals.

The following examples are intended to illustrate, but in no way limit, the scope of the present invention.

EXAMPLE 1

Preparation of Glucoside-Based Elastomers of the Present Invention and Conventional Polyurethane Elastomers This example demonstrates the production of glycoside-based polyurethane elastomers within the scope of the present invention and evaluates their physical properties, as compared to the physical properties of conventional polyurethane elastomers. Several elastomers having formulations as identified in TABLE I were prepared by a "one-shot" method. The procedure used to prepare Elastomer 1 was as follows: 12.7 parts by weight of a glycerol triol-based polyol (POLY-G 76-120, a product of Olin Corporation), 87.3 parts by weight of an methylene glucoside-based polyol, (POLY-G 79-375, a product of Olin Corporation), 0.1 parts of SF 1080 silicone surfactant were mixed at ambient temperature and atmospheric pressure until the mixture was homogeneous. Isocyanate was then added in an amount of 87.8 parts by weight to provide a 106 isocyanate index and the resulting mixture was degassed and cast into an open mold. Cure of the resulting elastomer was effected at a temperature of 115° C. overnight (a period of 16 hours). The other elastomers identified in TABLE I were prepared by an analogous procedure. TABLE I provides formulations for Elastomers 1 through 3 within the scope of the present invention, and Comparison Elastomers A and B as illustrative of the prior art.

Physical property test results for each of the elastomers is provided in TABLE I. Physical properties tested include the Shore D hardness in accordance with ASTM-D-2240-75, flexural modulus test in accordance with ASTM-D-790, tensile strength in accordance with ASTM-D-638, and elongation in accordance with ASTM-D-638 at various temperatures as specified in TABLE I. The results are provided in TABLE I which follows.

TABLE I

URETHANE ELASTOMER FORMULATIONS AND PHYSICAL PROPERTIES THEREOF

|  | Comparison Elastomer A | Comparison Elastomer B | Elastomer 1 | Elastomer 2 |
|---|---|---|---|---|
| Formulation in Parts by Weight: | | | | |
| POLY-G 76-120[1] | 77.0 | 77.3 | 12.7 | 23.7 |
| POLY-G 71-357[2] | 6.0 | — | — | — |
| POLY-G 79-375[3] | — | 5.7 | 87.3 | — |
| POLY-G 75-442[4] | — | — | — | 76.3 |
| Ethylene Glycol | 17.0 | 17.0 | — | — |
| SF-1080[5] | 0.1 | 0.1 | 0.1 | 0.1 |
| PAPI 135[6] Isocyanate (106 Index) | 105.7 | 105.9 | 87.8 | 90.0 |
| Physical Properties: | | | | |
| Shore D hardness[7] measured at: | | | | |
| 75° F. | 78 | 82 | 85 | 85 |
| 180° F. | 50 | 61 | 82 | 75 |
| 250° F. | 23 | 30 | 70 | 67 |
| Flexural Modulus[8], psi measured at: | | | | |
| R.T. | 363,750 | 365,300 | 415,666 | 406,475 |
| 140° F. | 34,850 | 48,680 | 331,566 | 302,175 |
| 180° F. | 5,572 | 4,246 | 296,854 | 245,475 |
| 250° F. | N/A | N/A | 141,825 | 55,852 |
| −40° F. | 545,225 | 528,475 | 493,933 | 536,950 |
| Shore D hardness[7] | | | | |

TABLE I-continued

| URETHANE ELASTOMER FORMULATIONS AND PHYSICAL PROPERTIES THEREOF | | | | |
|---|---|---|---|---|
| | Comparison Elastomer A | Comparison Elastomer B | Elastomer 1 | Elastomer 2 |
| measured at: | | | | |
| R.T. | 82 | 85 | 87 | 85 |
| 140° F. | 74 | 83 | 84 | 84 |
| 180° F. | 65 | 73 | 83 | 83 |
| 250° F. | 39 | 57 | 82 | 80 |
| Tensile Strength*[9], psi measured at | | | | |
| R.T. | 6,215 | 6,102 | 10,310 | 10,043 |
| 140° F. | 2,591 | 2,727 | 7,399 | 6,290 |
| 180° F. | 1,400 | 1,369 | 5,807 | 4,598 |
| 250° F. | 360 | 269 | 2,647 | 2,227 |
| Elongation*[10], % measured at: | | | | |
| R.T. | 30.4 | 22.4 | 13.3 | 14.0 |
| 140° F. | 59.0 | 83.6 | 9.5 | 14.5 |
| 180° F. | 58.3 | 60.9 | 10.0 | 11.2 |
| 250° F. | 14.3 | 12.1 | 13.8 | 26.7 |

[1] An ethylene-oxide capped triol having a molecular weight of about 1400, a hydroxyl number of 120, and a viscosity of 450 centipoise at 25° C.
[2] A sucrose amine polyol having a molecular weight of 720, a hydroxyl number of 357, and a viscosity of 2500 centipoise at 25° C.
[3] A methyl glucoside based polyol having a molecular weight of 570, a hydroxyl number of 375, and a viscosity of 9000 centipoise at 25° C.
[4] A methyl glucoside based polyol having a molecular weight of 420, a hydroxyl number of 442, and a viscosity of 5000 centipoise at 25° C.
[5] A silicone surfactant.
[6] A polyisocyanate having an isocyanate equivalent weight of 135, a product of Upjohn Corporation.
[7] In accordance with ASTM-D-2240-75.
[8] In accordance with ASTM-D-790.
[9] In accordance with ASTM-D-638.
[10] In accordance with ASTM-D-638.
*0.5 inch sample at a cross head speed of 2 in/min.

The physical property results as presented in TABLE I show that the physical properties of the elastomers of the present invention do not degrade at temperatures as high as 180° F. or above. More specifically, it should be noted that the elongation property for Elastomer 1 does not change dramatically as the temperature is changed from room temperature to 140° F. to 180° F. to 250° F. (see the corresponding elongation values of 13.3, 9.5, 10.0, and 13.8, respectively). In contrast, note the substantial jump in elongation values between room temperature and 140° F. for Comparison Elastomer A (a value of 30.4 versus a value of 59 for elongation) and for Comparison Elastomer B (a value of 22.4 versus a value of 83.6 for elongation). In comparison, note the consistency of elongation values across all temperature ranges for Elastomer 1 and note the stability of elongation values through 180° F. for Elastomer 2. The dramatic increase in elongation values between room temperature and 140° F. for the comparisons clearly indicate a thermal degradation of cross-linking bonds in those elastomers, thereby making the elastomers more stretchable or pliable. Such degradation is undesirable since the integrity of the comparison elastomers is compromised.

What is claimed is:

1. A polyurethane elastomer comprising the reaction product of at least one polyisocyanate with at least two polyether polyols, wherein one of said polyether polyols contains at least one glycoside moiety, said elastomer being essentially free of cellular structure.

2. The elastomer according to claim 1 wherein said glycoside is methyl glucoside.

3. A method of using a glycoside polyol which comprises reacting the glycoside polyol with a polyisocyanate to produce a polyurethane essentially free of cellular structure and characterized by thermal stability at a temperature of at least about 140° F. for a time period of at least 12 hours.

4. The method of claim 2 wherein said temperature is at least about 175° F.

5. The method of claim 2 wherein said glycoside is methyl glucoside.

6. The method of claim 2 which additionally comprises reacting a diol, triol or amine-containing polyol with an isocyanate to produce a polyurethane elastomer.

7. A method of producing a thermally stable, thermosetting polyurethane elastomer essentially free of cellular structure containing both glycoside-free and glycoside-containing polyurethane which comprises:
    (a) reacting a glycoside polyol with an isocyanate to produce a glycoside-containing polyurethane,
    (b) reacting a diol, triol or amine-containing polyol with an isocyanate to produce a glycoside-free polyurethane,
said glycoside-containing polyurethane being present in an amount of between about 40 and about 90 weight percent based upon the total weight of said glycoside-containing polyurethane and said glycoside-free polyurethane wherein steps (a) and (b) are carried out simultaneously at atmospheric pressure and a temperature of between about 25° C. and about 150° C.

8. The method of claim 7 wherein said glycoside polyol is a methyl glucoside polyol.

9. The elastomer according to claim 1 wherein said polyisocyanate is a polyarylpolypheny-lisocyanate.

10. The method of claim 3 wherein said polyisocyanate is a polyarylpolyphenylisocyanate.

11. The method of claim 7 wherein said polyisocyanate is a polyarylpolyphenylisocyanate.

12. The polyurethane produced by the method of claim 3.

13. The polyurethane elastomer produced by the method of claim 7.

* * * * *

UNITED STATES PATENT AND TRADEMARK OFFICE
CERTIFICATE OF CORRECTION

PATENT NO. : 4,629,768

DATED : December 16, 1986

INVENTOR(S) : Robert C. Hire and John E. Puig

It is certified that error appears in the above-identified patent and that said Letters Patent is hereby corrected as shown below:

In Column 2, line 39, after "monoethylene glycol" insert --,--.

In Column 3, line 26, after "mixture" delete "or" and insert --of--.

In Column 4, line 28, delete "paramenthane" and insert --paramethane--.

In Column 4, line 51, after "by" delete "using" and insert --use--.

In Column 6, line 18, after "of" delete "an".

In Column 7, Table I, after "Tensile Strength*$^{(9)}$, psi measured at" move the ":" to appear directly after the "t" in the word "at".

In Claim 4, line 34, after "claim" delete "2" and insert --3--.

In Claim 5, line 36, after "claim" delete "2" and insert --3--.

In Claim 6, line 38, after "claim" delete "2" and insert --3--.

Signed and Sealed this

Ninth Day of February, 1988

Attest:

DONALD J. QUIGG

*Attesting Officer*  *Commissioner of Patents and Trademarks*